United States Patent [19]

Filbert

[11] Patent Number: 4,857,674
[45] Date of Patent: Aug. 15, 1989

[54] STRAIN RELIEF DEVICE

[75] Inventor: Jacques Filbert, Longueuil, Canada

[73] Assignee: Leviton Manufacturing Company, Inc., Little Neck, N.Y.

[21] Appl. No.: 764,121

[22] Filed: Aug. 12, 1985

[51] Int. Cl.⁴ .................. H02G 15/007; H02G 3/22
[52] U.S. Cl. .................... 174/135; 24/458;
  174/153 G; 248/56; 248/222.3; 403/252
[58] Field of Search ............... 174/65 G, 138 D, 135,
  174/153 G, 65, 153; 16/2; 248/56, 73, 222.3,
  239; 339/103 B, 125 R, 126 R, 126 RS;
  403/252, 348, 353; 24/453, 458, 590, 591, 287,
  297; 411/349; 285/192, 201–205, 208, 209, 360;
  439/545, 546, 548

[56] References Cited

U.S. PATENT DOCUMENTS

| | | | |
|---|---|---|---|
| 789,734 | 5/1905 | Hochhausen | 439/546 |
| 2,626,773 | 1/1953 | Backman | 248/222.3 X |
| 2,826,388 | 3/1958 | Janos et al. | 248/239 |
| 2,940,558 | 6/1960 | Schlueter | 248/222.3 X |
| 3,235,219 | 2/1966 | Green | 248/222.3 X |
| 3,443,783 | 5/1969 | Fisher | 248/222.3 X |
| 3,559,152 | 1/1971 | Pearce, Jr. | 439/548 |
| 3,880,396 | 4/1975 | Freiberger et al. | 24/591 X |
| 3,910,536 | 10/1975 | Sharp et al. | 174/138 D X |
| 4,131,258 | 12/1978 | Okuda et al. | 248/73 |
| 4,527,760 | 7/1985 | Salacuse | 248/222.3 X |

FOREIGN PATENT DOCUMENTS

| | | | |
|---|---|---|---|
| 1465768 | 5/1969 | Fed. Rep. of Germany | 174/135 |
| 2273967 | 1/1976 | France | 403/353 |

Primary Examiner—Laramie E. Askin
Attorney, Agent, or Firm—Paul J. Sutton

[57] ABSTRACT

The invention features a strain relief device for mounting wires and cable into a panel. The body of the device carrying the cable is flexible and attached to the panel by a rotational motion. The panel is locked between two flanges of the body by a number of locking ramps that bias one of the flanges into locking engagement with the panel.

1 Claim, 5 Drawing Sheets

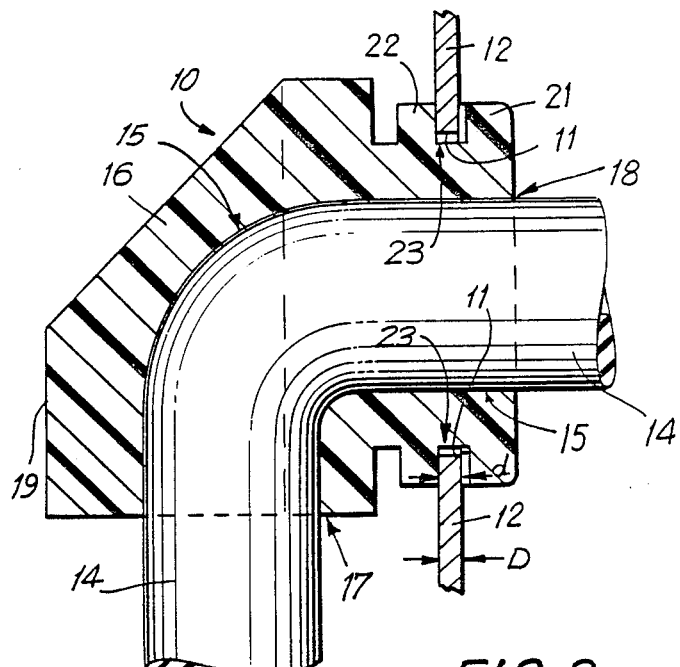
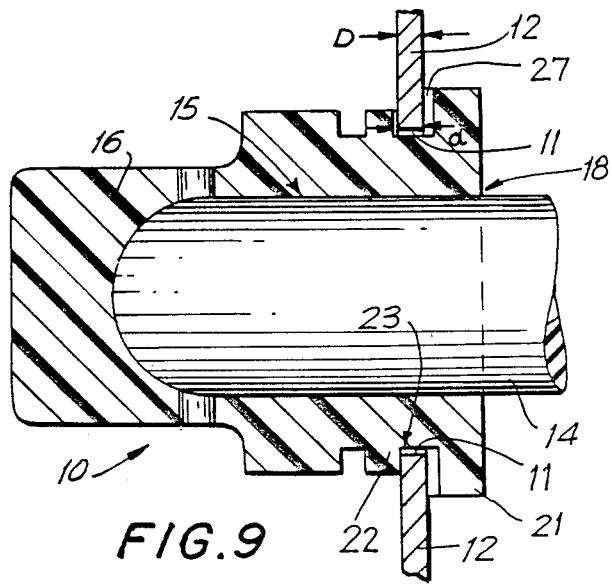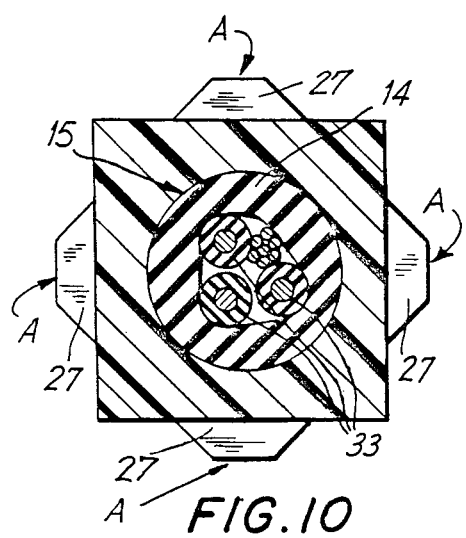

STRAIN RELIEF DEVICE

FIELD OF THE INVENTION

The invention features a strain relief device for installation of wire and cable into panelling, and more particularly to a flexible strain relief device that is easily mountable in a panel and which can accommodate a variety of wire and cable.

BACKGROUND OF THE INVENTION

In mounting power supply cords and other electrical wires or cables in a panel, it is necessary to install them such that strain is not imposed upon the copper conductors and the surrounding insulation. The stressing of wires or cables at their points of contact with panelling can lead to serious shorting or disruption of the electrical current.

In the past, a strain relief device was utilized to alleviate cable stresses, wherein the device housing was clamped around the cable and threaded into the panelling. While the threaded strain relief protected the wires, it was too cumbersome and costly to install.

The present invention features a new strain relief design that quickly and easily mounts to a panel, and which has the further advantage of accommodating wires, cords and cables of varying types, materials, and construction. The strain relief device of this invention will provide good retention of the wires subject to both normal and torsional forces applied at the entry point in the panel.

BRIEF SUMMARY OF THE INVENTION

The invention relates to a flexible strain relief device for installing wire or cable into a square aperture disposed in panelling. The device comprises a flexible body having a wire or cable supporting conduit. The entrance of the conduit is disposed at a bottom portion. First and second flanges are provided at the rear portion of the body. These flanges are approximately square in shape. The flanges are spaced apart by at least a thickness of the panelling, and have an approximate 45 degrees orientation with respect to each other, i.e. the flanges are displaced at an angle of 45 degrees about a central body axis.

The strain relief devices is inserted in the square aperture of the panelling by orienting the body at approximately 45 degrees with respect to an upright position, i.e. at a 45 degree angle about the central body axis. In this position, the first flange will pass through the square aperture. The strain relief device is then rotated approximately 45 degrees back to the upright position, whereby the first flange becomes locked behind the panelling. The panelling is now disposed between the first and second flanges.

The first flange has chamfered corners that allow the flange to pass through the square aperture in the panelling at a 45 degree orientation, but become locked in the upright position.

A number of ramps disposed along a front portion of the first flange biases the strain relief device into locking engagement with the panelling. Each ramp is disposed about a corner of the first flange. The front portion of the first flange is disposed oppositely a rear portion of the second flange, so that the panelling will become locked between the two flanges.

A pair of holes in the body receive the teeth of a torquing tool for rotating the body of the strain relief device with respect to the panelling.

It is an object of the invention to provide an improved strain relief device.

It is another object of this invention to provide a strain relief device that is easy to install and can accommodate many different wire, cord, and cable types.

These and other objects of the invention will become more apparent and will be better understood with respect to the following detailed description considered in conjunction with the accompanying drawings.

BRIEF DESCRIPTION OF THE DRAWINGS

FIG. 8 is a sectional side view of the strain relief device and cable in a mounted position on the panelling;

FIG. 9 is a sectional bottom view of the strain relief device and cable depicted in FIG. 8;

FIG. 10 is a front sectional view of the strain relief device and cable illustrated in FIG. 8, taken between the first and second flanges.

DETAILED DESCRIPTION OF THE INVENTION

Generally speaking, the invention pertains to a strain relief device for mounting wires or cables to a panel.

Figure 1:
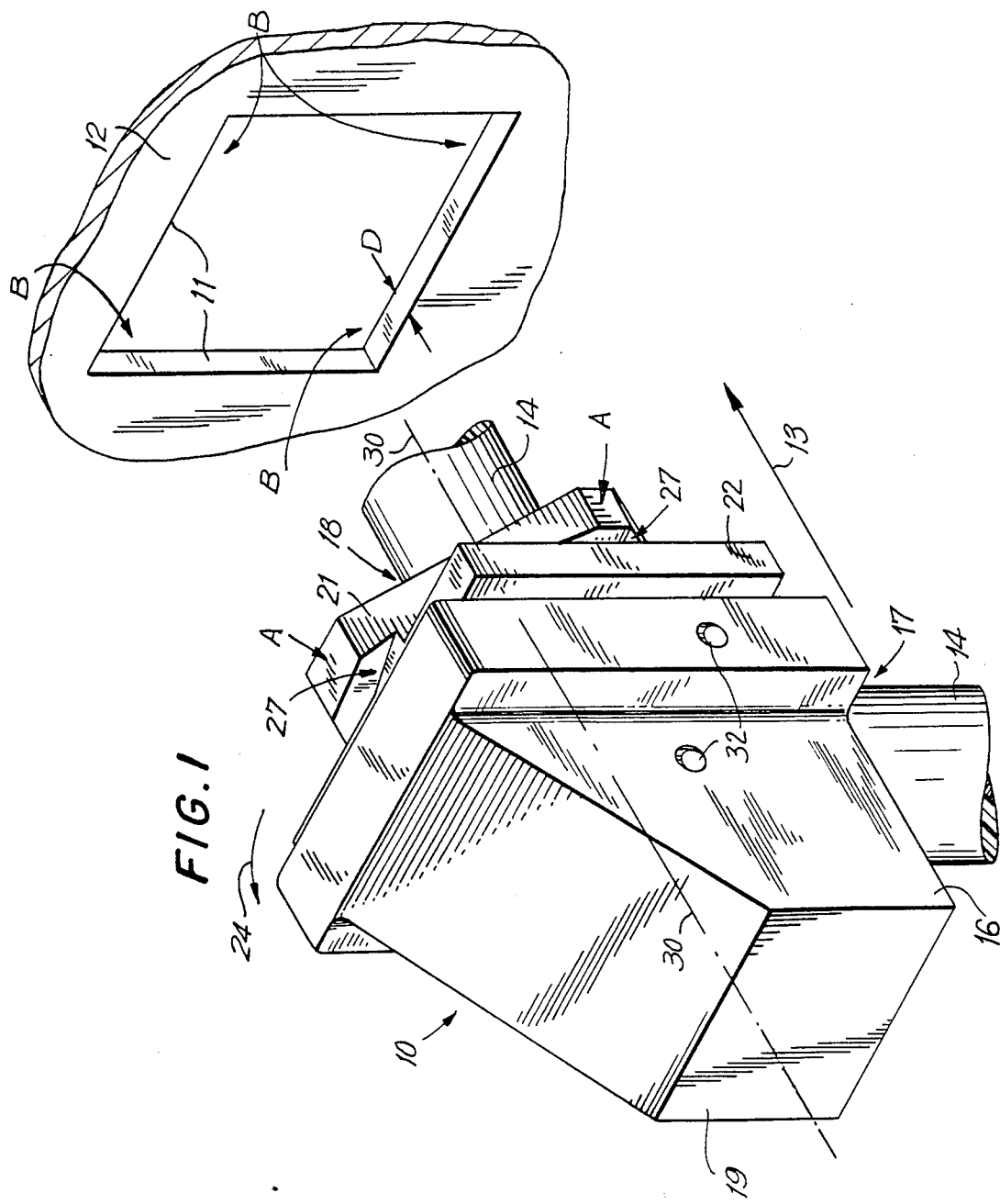
FIG. 1 is a perspective view of the strain relief device of this invention with a cable disposed therein, and the square aperture of a panel into which the device is to be inserted.
Figure 2:
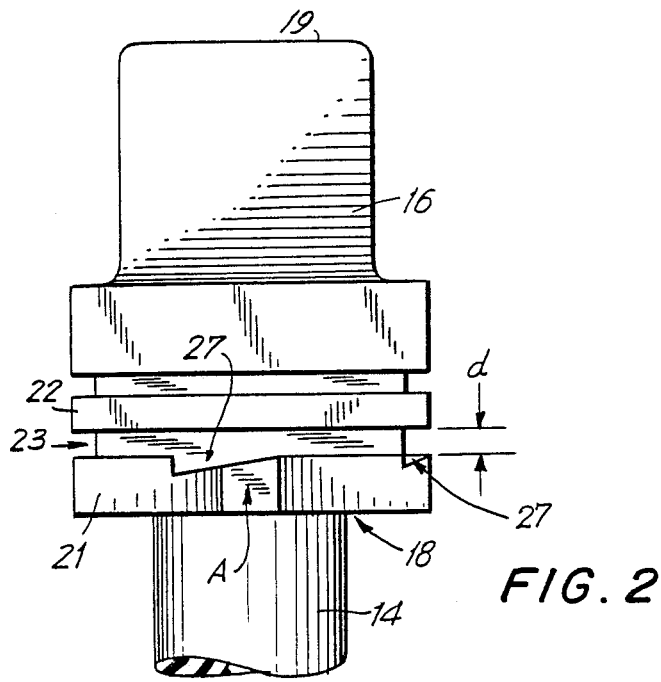
FIG. 2 is a top view of the strain relief device, with a cable disposed therein.

Referring now to the figures, and particularly to FIG. 1, a strain relief device 10 of this invention is illustrated in an upright position with respect to a square aperture 11 in a panel 12 into which it is to be inserted (arrow 13).

The strain relief device 10 is made of a flexible material such as hard rubber, and carries a cable 14 in a conduit 15 (FIG. 8) running through its one-piece body 16, from a bottom entrance 17 to a rear exit 18.

The body 16 of device 10 has a snubbed-nose section 19 for protecting the cable 14 from shock forces.

The rear portion of body 16 has two flanges 21 and 22, respectively. The flanges 21 and 22 are separated by a groove 23 having a thickness "d" equal or slightly greater than the thickness "D" of plate 12, as best seen in FIGS. 8 and 9. An approximately square spacer portion 25 at least as thick as the panelling and slightly smaller than the square aperture 11 is located in the groove 23 between the flanges 21 and 22. This spacer portion 25 is oriented 45 degrees with respect to flange 21. FIGS. 8 and 9 illustrate the device 10 mounted to plate 12.

Figure 3:
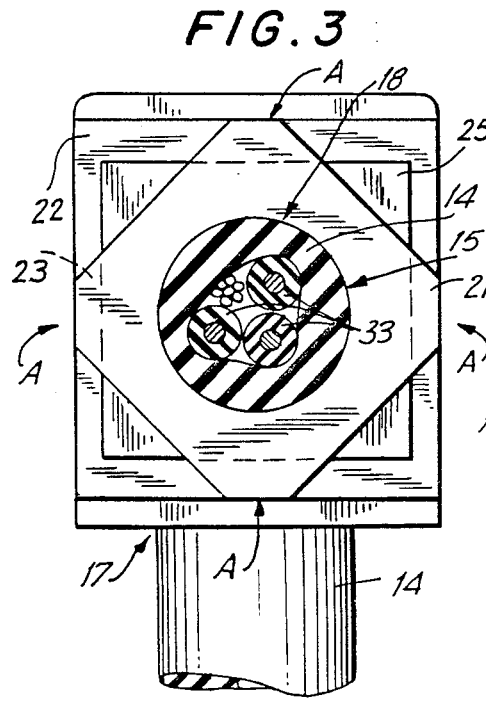
FIG. 3 is a back view of the strain relief device, with a sectional cut shown through a cable disposed therein.
Figure 4:
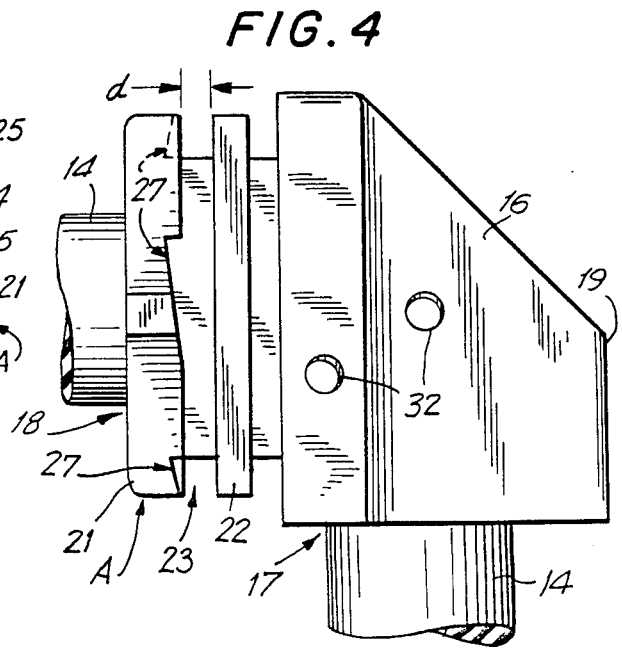
FIG. 4 is a left side view of the strain relief device and cable.
Figures 5, 6:
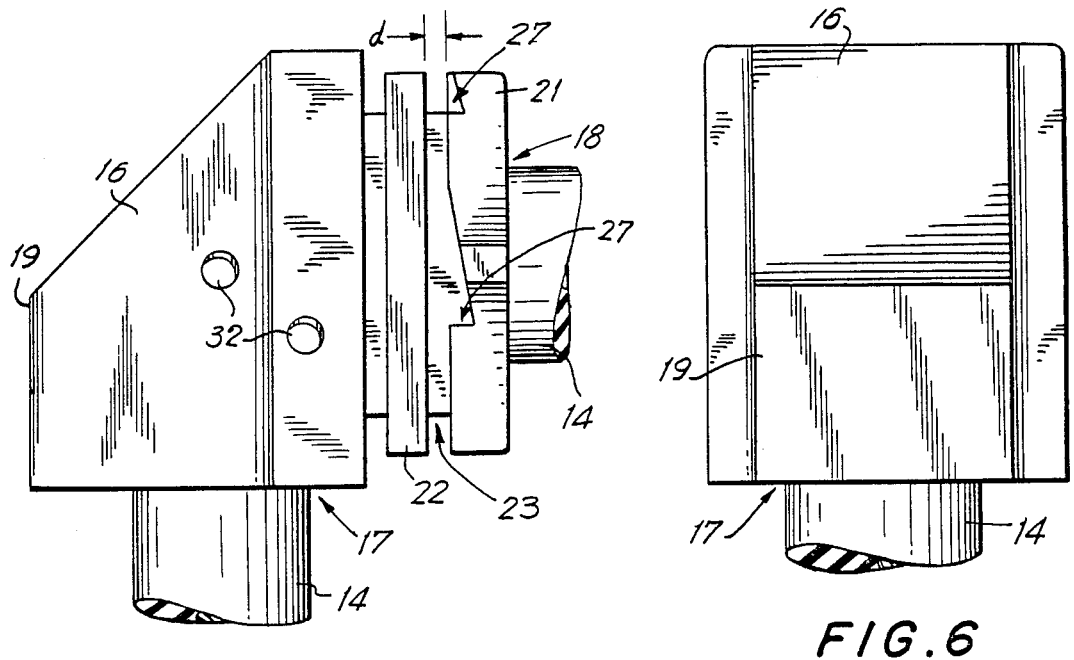
FIG. 5 is a right side view of the strain relief device and cable.
FIG. 6 is a front view of the strain relief device and cable.
Figure 11:
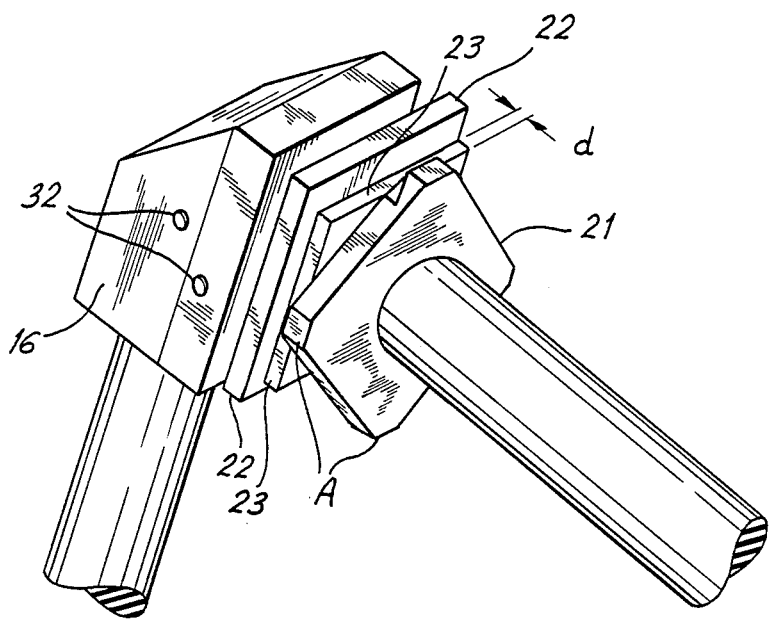
FIG. 11 is a perspective back view of the strain relief device and cable.

Flanges 21 and 22 are approximately square-shaped, except that the corners "A" of flange 21 are chamfered to give an octanogal appearance, as best seen in FIGS. 3, 10, and 11.

When the device 10 is to be inserted into (arrow 13) aperture 11 of plate 12 (FIG. 1), it is necessary to rotate (arrow 24) the body 16 from its illustrated upright position, and push (arrow 13) flange 21 into aperture 11.

At an angle of 45 degrees counterclockwise about center axis 30, the chamfered corners A of flange 21 will clear the corner sections "B" of aperture 11, and allow the flange 21 to pass behind the plate 12.

If the body 16 is now rotated back to its upright position (45 degrees clockwise), the corners A of flange 21 will lock into place behind plate 12, thus attaching the strain relief device 10 to plate 12. In this locked position, the plate 12 is disposed in groove 23 between the flanges 21 and 22, respectively and the square spacer portion 25 is located in the square aperture 11, thus preventing the strain relief device from rotating.

A locking fit is ensured by means of ramps 27 cut into corners A of flange 21, which ramps provide camming leverage between the plate 12 and flange 21 when the body 16 is rotated 45 degrees clockwise to the upright position shown in FIG. 1.

Holes 32 may be provided in body 16 for receipt of a torquing tool (not shown) for rotating the body 16 about axis 30 in a clockwise direction.

Figure 7:
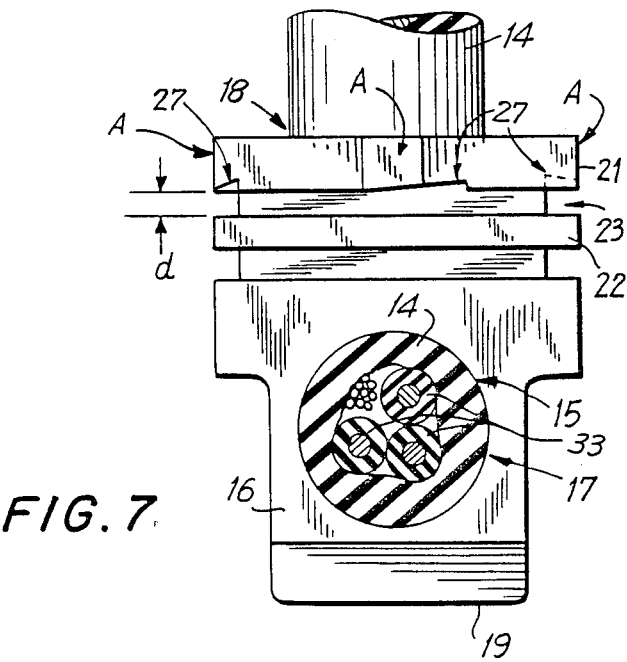
FIG. 7 is a bottom view of the strain relief device and cable, with a sectional cut shown through the cable.

A typical cable 14 that can be used with device 10 can be a power cord having three insulated conductors 33, as depicted in FIGS. 3, 7 and 10. Of course, the device 10 can also be utilized with other types of wire or cabling, as befits the need. Flat and square cordage can also be used with the inventive strain relief device. Appropriate modifications will occur to those skilled in this art.

Having thus described the invention, what is desired to be protected by Letters Patent is presented in the subsequently appended claims.

What is claimed is:

1. A flexible relief device for installing wire or cable into a square aperture disposed in panelling, comprising:
    a flexible body,
        means defining a wire or cable supporting conduit having an entrance in said body at a bottom portion thereof and an exit in said body at a rear portion thereof,
        a first approximately square flange slightly smaller than the square aperture, disposed at said rear portion,
        a second flange, including a rearward facing surface that is larger than the square aperture so that it cannot pass through the square aperture,
        an approximately square spacer portion, at least as thick as the panelling and slightly smaller than the square aperture, located between said first and second flanges, said first flange and said spacer portion having an orientation of approximately 45 degrees with respect to each other as measured about a central axis in said body, the corners of said first flange being chamfered so as to pass unhindered through said square aperture at approximately a 45 degree angle of orientation with respect to an upright position,
        ramps, at the corners of said first flange, recessed within the surface that is facing the rearward surface of said second flange,
        each ramp opening to a radial edge of said first flange for receiving the panel, and to a radial edge of said spacer portion for delivering the panel, and having its ramping surface angled so that camming forces upon said first sand second flanges and spacer portion are applied annularly and so that minimal force is applied on flange and spacer portion corners radially toward the central axis,
        so that upon insertion of said strain relief device in said square aperture of said panelling by orienting said body at approximately 45 degrees with respect to an upright position such that said first flange passes through said square aperture in said panelling, and then rotating said strain relief device approximately 45 degrees back to said upright position, said ramps cam against the panelling until the spacer portion moves into the square aperture, resisting further rotation, whereby said first flange becomes locked behind said panelling, and said panelling is disposed between said first and said second flanges, said body including a pair of holes for receiving teeth of a torquing tool for rotating said body with respect to said panelling, said body further comprising a snub-nosed section for shock force protection, and
    said second flange being spaced from said snub-nosed section for resilient absorption of bending forces.

* * * * *